United States Patent [19]

Renaud

[11] Patent Number: 5,115,592
[45] Date of Patent: May 26, 1992

[54] BRAKED ARTIFICIAL FISHING PLUG

[76] Inventor: Ronnie C. Renaud, Rte. 1, Liberty, S.C. 29657

[21] Appl. No.: 565,519

[22] Filed: Aug. 9, 1990

Related U.S. Application Data

[63] Continuation of Ser. No. 311,754, Feb. 17, 1989, abandoned.

[51] Int. Cl.⁵ .............................................. A01K 85/00
[52] U.S. Cl. .................................................... 43/42.47
[58] Field of Search ................... 43/42.45, 42.47, 42.51

[56] References Cited

U.S. PATENT DOCUMENTS

| | | | |
|---|---|---|---|
| 1,177,281 | 3/1916 | Schweickert | 43/42.47 |
| 1,836,651 | 12/1931 | Davenport | 43/42.47 |
| 2,561,515 | 7/1951 | Keeler | 43/42.51 |
| 2,719,377 | 10/1955 | Bennett | 43/42.47 |
| 2,737,751 | 3/1956 | Munsch | 43/42.47 |
| 2,760,294 | 8/1956 | Morrill | 43/42.45 |
| 2,927,392 | 3/1960 | Lievense | 43/42.47 |
| 3,344,549 | 10/1967 | Peters | 43/42.47 |

Primary Examiner—Kurt Rowan
Attorney, Agent, or Firm—Cort Flint

[57] ABSTRACT

An artificial fishing bait is disclosed which includes a fishing plug having a plug body. Atop the plug body near a forward end is a brake consisting of a fin plate having an impact surface which brakes the plug retrieval causing a natural wobbling motion and sonic vibrations to be produced. Preferably, the fin plate is larger than half the plug body width and height, and in a range from one-third to three-quarters.

12 Claims, 2 Drawing Sheets

BRAKED ARTIFICIAL FISHING PLUG

This is a continuation of copending application Ser. No. 07/311,754 filed on Feb. 17, 1989 now abandoned.

BACKGROUND OF THE INVENTION

The invention relates to an artificial fishing plug, and particularly to the provision of an artificial fishing bait having the resemblance of a bait fish schooling in the water.

With the increased popularity in sport and contest fishing, the demand for more diverse fishing plugs has developed. In addition, with the introduction of hybrid bass and other different types of sport fish into the fishing reservoirs, the need for different types of artificial baits has arisen. In particular, the sport of fishing for the larger hybrid bass and striper fish species in man made impoundments has necessitated the use of larger fishing plugs which have more diverse fishing actions than those heretofore proposed. These fish often feed on bait fish which school on or near the surface of the water. The conventional deep running or top fishing plug retrieves too fast and too straight in order to effectively simulate the natural motion of schooling bait fish.

Accordingly, an important object of the invention is to provide an artificial fishing bait which retrieves slowly and has a natural wobbling motion much like that of a bait fish.

Another object of the invention is to provide an artificial fishing bait having increased wobbling motion.

Still another important object of the present invention is to provide an artificial fishing bait which produces increased sonic vibrations while being retrieved more slowly.

SUMMARY OF THE INVENTION

The above objectives are accomplished according to the present invention by providing a brake carried on a top portion of a body of a fishing plug near a forward end which serves to slow down the retrieval of the plug, impart a wobbling motion to the plug, and produce sonic vibrations. Preferably, the brake includes a vertical or near vertical fin plate extending upwardly and having a planar or forwardly concave surface inclined toward the front of the body. The fin plate covers substantially more than half of the width of the fishing plug body and extends upwardly a sufficient distance to cause significant drag and slowing of the plug. The brake plate preferably extends upward to brake the surface of the water in the case of a top or near top water fishing plug to produce sonic and wobbling actions.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
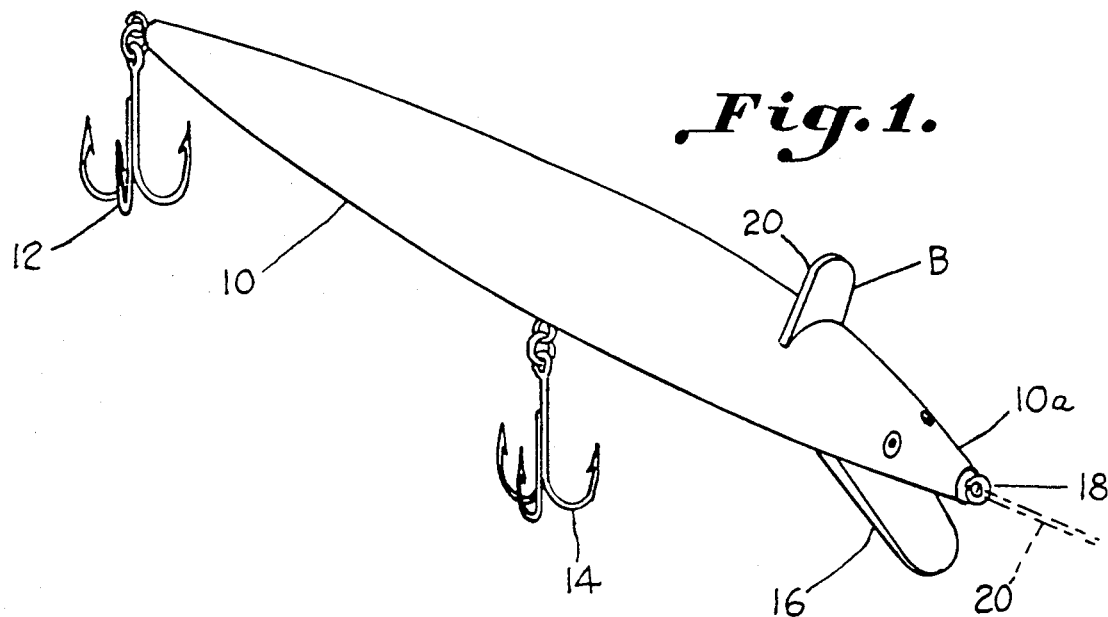
FIG. 1 is a perspective view of an elongated artificial fishing plug with a brake constructed in accordance with the present invention.
Figure 2:
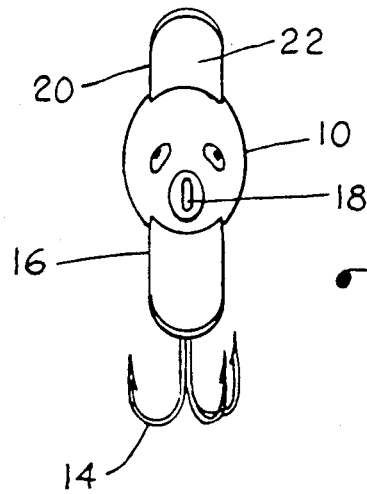
FIG. 2 is a front elevation of a plug of FIG. 1.
Figure 3:
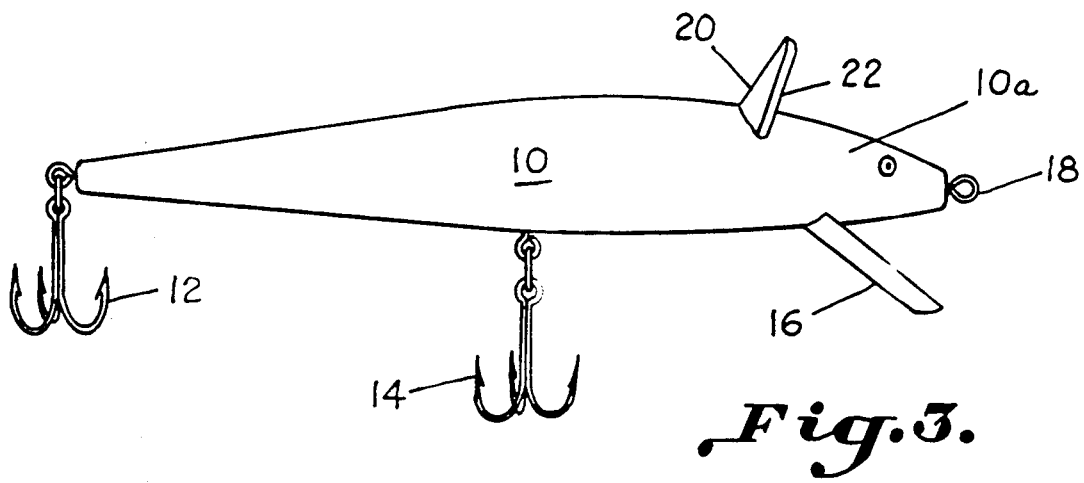
FIG. 3 is a side elevation of an elongated fishing plug with a brake constructed in accordance with the present invention.

Referring now in more detail to the drawings, FIG. 1 illustrates an artificial fishing bait designated generally as A which includes an elongated body 10 having a plurality of treble hooks 12 and 14 depending downwardly from the body. Adjacent a forward end 10a of the fishing body is a front spoon bill 16 and an eyelet 18 to which a fishing line 20 is attached. The fishing plug of FIGS. 1-3 is illustrated as a top water or near top water fishing plug. A brake means B is carried atop body 10 of artificial fishing plug A for producing sonic vibrations and slowing the plug down to represent the natural wobbling motions and sound of a bait fish. In particular, brake means B produces a sound like a bait fish breaking the water when employed with a top water fishing lure such as that illustrated in FIGS. 1-3. This motion and sound reproduced that of a natural bait fish schooling and breaking the top of the water. The slow retrieval looks and sounds like a natural bait fish breaking the water which is very effective for attracting fish. As illustrated, brake means B includes an upwardly extending fin plate 20 which has a slightly forward, concave surface 22 facing forward of the fishing plug. Fin plate 20 extends upwardly a sufficient vertical distance to produce the sonic vibrations and slow retrieval desired. Fin plate 20 extends generally vertical with a slight forward inclination. This is preferable because a rearward inclination would tend to decrease the braking effect and that of producing sonic vibrations. Fin plate 20 must extend upwardly a sufficient distance to break the surface of the water in the case of a top water fishing lure as illustrated. As can best be seen in FIG. 2, fin plate 20 preferably has a width which is at least as great as one-third the width of fish body 10 to about three-quarters the width. If fin plate 22 is too narrow it cuts through the water and does not produce the desired sonic and wobbling actions, nor slow retrieval.

Figure 4:
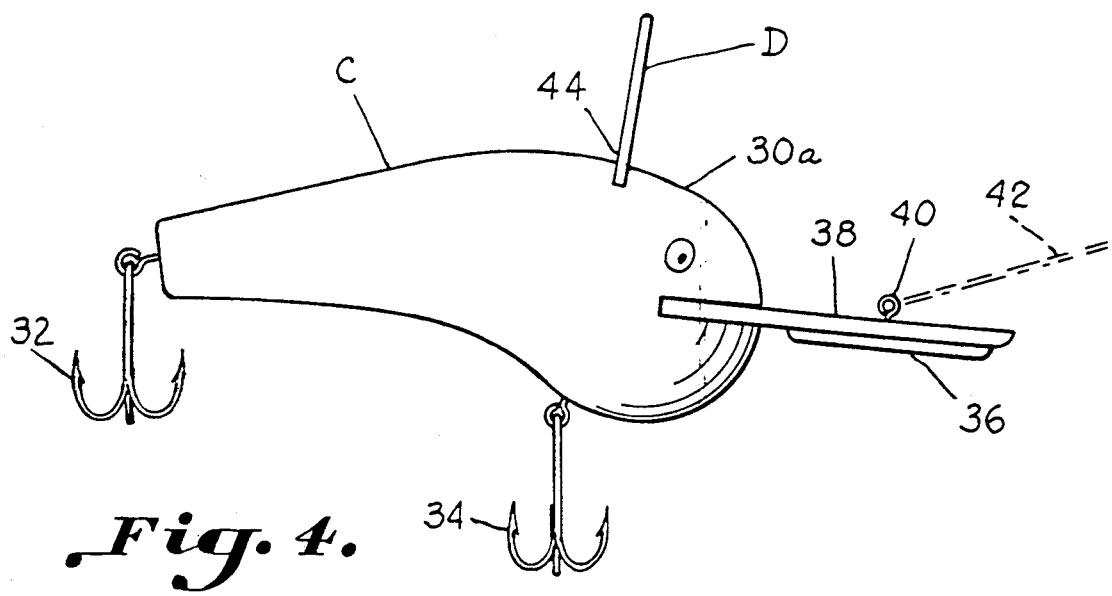
FIG. 4 is a side elevation of another embodiment of a different type fishing plug and brake constructed in accordance with the present invention.
Figure 5:
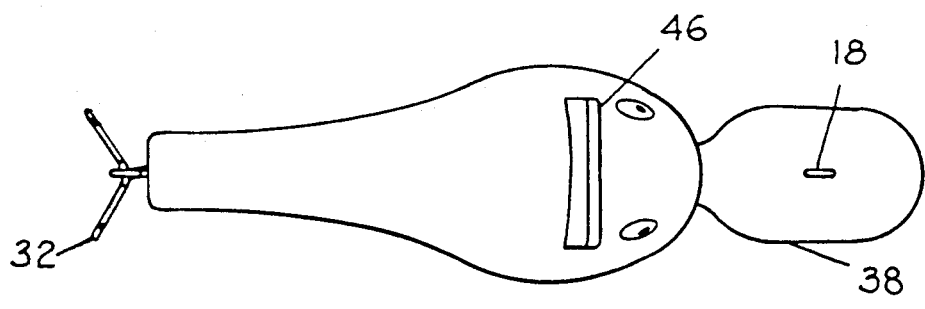
FIG. 5 is a top plan view of the fishing plug of FIG. 4.
Figure 6:
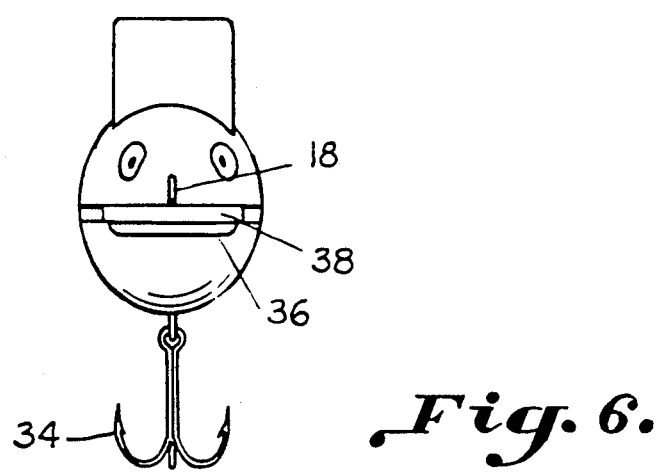
FIG. 6 is a front elevation of the fishing plug of FIG. 5.

Referring now to FIGS. 4 and 6, another embodiment of an artificial fishing plug designated generally as C is illustrated having a plug body 30 and treble hooks 32 and 34 depending from the body. In this case, fishing plug C is illustrated as a deep water plug having a lead weight 36 carried by a spoon bill 38 to which an eyelet is affixed for attachment to fishing line 42. Spoon bill 38 may be affixed in fishing plug body 30 or may be a broken bill such as that disclosed in applicant's U.S. Pat. No. 4,777,761 issued on Oct. 18, 1988 and entitled "Broken Bill Fishing Plug". In this case, a brake means D is illustrated carried atop plug body 30 near a forward end 30a of the plug body for producing sonic vibrations, wobbling, slow retrieval, and possibly deeper diving of the plug. Since fishing plug C may take a more inclined orientation while diving and retrieving. Brake means D comprises a fin plate 44 having a higher profile than that of fin plate 20 of fishing plug A. For this purpose, fin plate 44 includes a planar surface 46 which confronts water as the plug dives and is retrieved. Again, the width of fin plate 44 is in the range of one-half to three-quarters that of body 30 of fishing plug C and preferably greater than one-half the width. In combination with the leaded weight of fishing plug C, brake means D causes the plug to be retrieved more slowly, and produce sonic vibrations and wobbling motions under the water simulating that of natural bait. During retrieval, the force of water against the brake means causes the plug to dive deeper into the water.

In either case, brake means B and D cause a natural side-to-side wobbling motion to be imparted to the plug during retrieval. In essence, this wobbling motion will occur in 3-dimensions. This, plus the slower movement of the plug through the water, produces a highly effective artificial bait simulation. In combination with the noise produced, a highly effective artificial fishing plug is provided.

While a preferred embodiment of the invention has been described using specific terms, such description is for illustrative purposes only, and it is to be understood that changes and variations may be made without departing from the spirit or scope of the following claims.

What is claimed is:

1. An artificial fishing plug comprising:
   an elongated plug body having a forward end and a rearward end;
   a plurality of fishhooks attached to a bottom portion and said rear end of said fishing plug body;
   brake means carried by a top surface of said plug body opposite said bottom portion and disposed rearward of said forward end of said plug body, said brake means extending along a first plane and generally upwards from said top surface, said brake means being centered laterally and spanwise across said top surface of said fishing plug body for slowing the retrieve of said fishing plug through the water and producing a natural wobbling motion and sonic vibrations;
   and a weighted spoon bill carried below and forward of said brake means by said forward end of said fish plug body and extending in a second plane generally perpendicular to said first plane.

2. The device of claim 1 wherein said brake means has a front surface with a width in a range of one-third to three-quarters of the width of said fishing plug body.

3. The device of claim 2 wherein said surface is concave forwardly with respect to said forward end of said fishing plug body.

4. The device of claim 1 wherein said brake means has a planar front surface.

5. An artificial fishing plug comprising:
   an elongated plug body having a bottom portion and a top surface opposite said bottom portion;
   means for attaching a fishing line to a forward end of said plug body;
   a spoon attached to a forward portion of said bottom portion of said plug body to project downwardly along a first plane
   brake means comprising a fin plate carried by said top surface of said plug body and extending along a second plane, different from said first plane, said second plane being generally perpendicular to said top surface of said fishing plug body, said fin plate being disposed rearwardly of said forward end of said plug body and said spoon;
   said fin plate being centered laterally with respect to said top surface and having a width in a range of one-third to three-quarters of the width of said plug body for slowing the retrieval of said plug body through the water while producing sonic vibrations t create an audible signal for attracting fish and a natural wobbling motion.

6. The device of claim 5 wherein said fin plate has a height in a range of about one-third to three-quarters of said fishing plug body.

7. The device of claim 5 wherein said fishing plug body is buoyant to constitute a top water fishing plug and said fishing plug body and said fin plate has a height which extends to break the surface of the water when said fishing plug is fished near the surface of said water.

8. The device of claim 5 wherein said brake means includes a surface facing forward of said fishing plug having a vertical and lateral extent to effectively slow the retrieve of said fishing plug through the water and produce said sonic vibrations.

9. The device of claim 8 wherein said facing surface has a width of one-third to three-quarters of the width of said fishing plug body.

10. The device of claim 5 wherein a forward surface of said brake means is concave with respect to said forward end of said fishing plug body.

11. The device of claim 5 wherein a forward surface of said brake means is planar.

12. The device of claim 5 wherein said plug body is buoyant and provides a top water fishing plug; and said brake means includes a finned plate which has a vertical extent sufficient to break the surface of said water to create a natural noise of a bait breaking of water.

* * * * *